(12) United States Patent
Ramarathnam et al.

(10) Patent No.: US 11,932,403 B2
(45) Date of Patent: Mar. 19, 2024

(54) TRAY TABLE WITH HONEYCOMB CORE

(71) Applicant: Safran Seats USA LLC, Gainesville, TX (US)

(72) Inventors: Gokul Ramarathnam, Irvine, CA (US); Reza Mansouri, Costa Mesa, CA (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/572,426

(22) Filed: Jan. 10, 2022

(65) Prior Publication Data
US 2023/0219689 A1 Jul. 13, 2023

(51) Int. Cl.
*B64D 11/06* (2006.01)

(52) U.S. Cl.
CPC ............................... *B64D 11/0638* (2014.12)

(58) Field of Classification Search
CPC ........ B64D 11/0638; A47C 7/68; B60N 3/004
USPC ................................................. 297/146, 293
See application file for complete search history.

(56) References Cited

U.S. PATENT DOCUMENTS

| | | | | |
|---|---|---|---|---|
| 3,009,737 | A * | 11/1961 | Burnett | B60N 3/001 108/134 |
| 5,601,035 | A * | 2/1997 | Herring | B65D 19/0026 108/51.3 |
| 5,605,102 | A * | 2/1997 | Simpson | A47F 10/04 108/56.1 |
| 5,876,092 | A * | 3/1999 | An | B64D 11/0638 297/146 |
| 6,227,515 | B1 * | 5/2001 | Broyles | G02B 7/00 248/346.02 |
| 7,004,430 | B2 * | 2/2006 | Weekly | B60N 3/004 16/248 |
| 7,621,593 | B2 * | 11/2009 | Dickinson | B60N 3/004 297/188.05 |
| 8,936,308 | B2 * | 1/2015 | Petersen | B60N 3/004 297/146 |
| 8,997,660 | B2 * | 4/2015 | Satterfield | A47B 13/081 108/73 |
| 9,969,311 | B2 * | 5/2018 | Stewart | B60N 3/004 |
| 10,625,864 | B2 * | 4/2020 | Tiwari | B29C 45/73 |
| 2003/0079657 | A1 * | 5/2003 | Preisler | B65D 19/0012 108/51.3 |
| 2003/0079659 | A1 * | 5/2003 | Preisler | B65D 19/0028 108/51.3 |

(Continued)

FOREIGN PATENT DOCUMENTS

| | | |
|---|---|---|
| CN | 109334530 A | 2/2019 |
| WO | 2017070379 A1 | 4/2017 |

OTHER PUBLICATIONS

International Patent Application No. PCT/US2023/010181, International Search Report and Written Opinion, dated Apr. 4, 2023.

*Primary Examiner* — Jose V Chen
(74) *Attorney, Agent, or Firm* — Kilpatrick Townsend & Stockton LLP

(57) ABSTRACT

Described are tray tables having a shroud and a core assembly. The shroud may form an outer surface of the tray table. The core assembly may be within the shroud and may include a top sheet, a bottom sheet, and a honeycomb core. The honeycomb core may be between the top sheet and the bottom sheet. The honeycomb core may define a plurality of cells.

19 Claims, 3 Drawing Sheets

(56) References Cited

U.S. PATENT DOCUMENTS

| | | | |
|---|---|---|---|
| 2003/0193220 A1* | 10/2003 | Jensen | B64D 11/0638 297/146 |
| 2011/0187163 A1* | 8/2011 | Westerink | B64D 11/0638 29/525.01 |
| 2011/0204683 A1* | 8/2011 | Roy | B64D 11/0638 297/163 |
| 2014/0292042 A1 | 10/2014 | Stewart et al. | |
| 2021/0402897 A1* | 12/2021 | Glain | B60N 2/34 |

* cited by examiner

TRAY TABLE WITH HONEYCOMB CORE

FIELD OF THE INVENTION

The field of the invention relates to passenger seats, and, more particularly, to tray tables having honeycomb core assemblies.

BACKGROUND

Passenger vehicles, such as aircraft, buses, trains, ships, and automobiles, often include at least one passenger seats in which passengers may be seated or otherwise use during travel. A passenger seat may include a tray table assembly that may be used for various purposes including deploying for holding food, stowing for allowing passengers or other suitable individuals to move with respect to the passenger seat, and the like. Contemporary tray tables may include materials and designs that cause the contemporary tray tables to be heavy or to use excessive amounts of resources. Additionally, the contemporary tray tables may excessive amounts of various parts or components that may be sources for points-of-fail during use of the contemporary tray tables.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a tray table for a passenger seat may include a shroud and a core assembly. The shroud may form an outer surface of the tray table. The core assembly may be positioned within the shroud and may include a top sheet, a bottom sheet, and a honeycomb core. The honeycomb core may be positioned between the top sheet and the bottom sheet and may define a set of cells.

In some embodiments, the top sheet, the bottom sheet, and the honeycomb core may each include aluminum. In certain embodiments, a thickness of the top sheet may be different from a thickness of the bottom sheet. In various embodiments, the thickness of the top sheet may be greater than the thickness of the bottom sheet. In some embodiments, the outer surface may include a top surface of the tray table, a bottom surface of the tray table, or a combination thereof, and each cell of the set of cells of the honeycomb core may include a central axis extending perpendicular to a plane of the top surface or the bottom surface of the tray table.

In certain embodiments, a width of the top sheet may be different from a width of the bottom sheet. In various embodiments, the width of the top sheet may be greater than the width of the bottom sheet. In some embodiments, a width of the top sheet may be different from a width of the honeycomb core. In certain embodiments, the width of the top sheet may be greater than the width of the honeycomb core. In various embodiments, the top sheet may include a top surface, the bottom sheet may include a bottom surface, and a surface area of the top surface may be greater than a surface area of the bottom surface.

In some embodiments, the tray table may optionally include a slide housing within the shroud and attached to the core assembly. The slide housing may be configured to engage a sliding mechanism of the tray table, and the slide housing may be attached to the top sheet, the honeycomb core, or the bottom sheet. In certain embodiments, the top sheet may include a top surface and a bottom surface, and the slide housing may be attached to the bottom surface of the top sheet. In various embodiments, the tray table may optionally include a slide housing attached to the shroud, and the slide housing may be configured to engage a sliding mechanism of the tray table.

In some embodiments, a passenger seat assembly may include the tray table and a table support. The table support may attach the tray table to the passenger seat, and the tray table may be pivotably supported on the table support. In certain embodiments, the passenger seat may optionally include a sliding mechanism connecting the tray table with the table support, and the tray table may optionally include a slide housing within the shroud and attached to at least one of the top sheet or the honeycomb core.

According to certain embodiments of the present invention, a tray table for a passenger seat may include a shroud and a core assembly. The shroud may form a top surface and a bottom surface of the tray table. The core assembly may be positioned in the shroud and may include a honeycomb core that may define a set of cells. Each cell of the set of cells may include a central axis extending perpendicular to at least one of the top surface or the bottom surface of the tray table.

In some embodiments, the core assembly may include a top sheet and a bottom sheet within the shroud, and the honeycomb core may be positioned between the top sheet and the bottom sheet. In certain embodiments, at least one characteristic of the top sheet may be different from the bottom sheet, and the at least one characteristic may include a thickness, a width, or a surface area.

According to certain embodiments of the present invention, a tray table for a passenger seat may include a shroud assembly and a core assembly. The shroud assembly may define a top surface of the tray table, a bottom surface of the tray table, and a receiving area of the shroud assembly between the top surface and the bottom surface. The core assembly may be positioned within the receiving area of the shroud assembly and may include a sheet and a honeycomb core. The honeycomb core may extend from the sheet, which may be positioned between the honeycomb core and a portion of the shroud assembly. The honeycomb core may define a set of cells.

In some embodiments, the sheet may be a top sheet, and the core assembly includes a bottom sheet. The honeycomb core may be positioned between the top sheet and the bottom sheet, the shroud assembly may include a plastic material, and the core assembly may include a metal material.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide tray tables having honeycomb cores for passenger seats. While the tray tables having honeycomb cores are discussed for use with aircraft seats, they are by no means so limited. Rather, embodiments of the tray tables having honeycomb cores may be used in passenger seats or other seats of any type or otherwise as desired.

Figure 1:
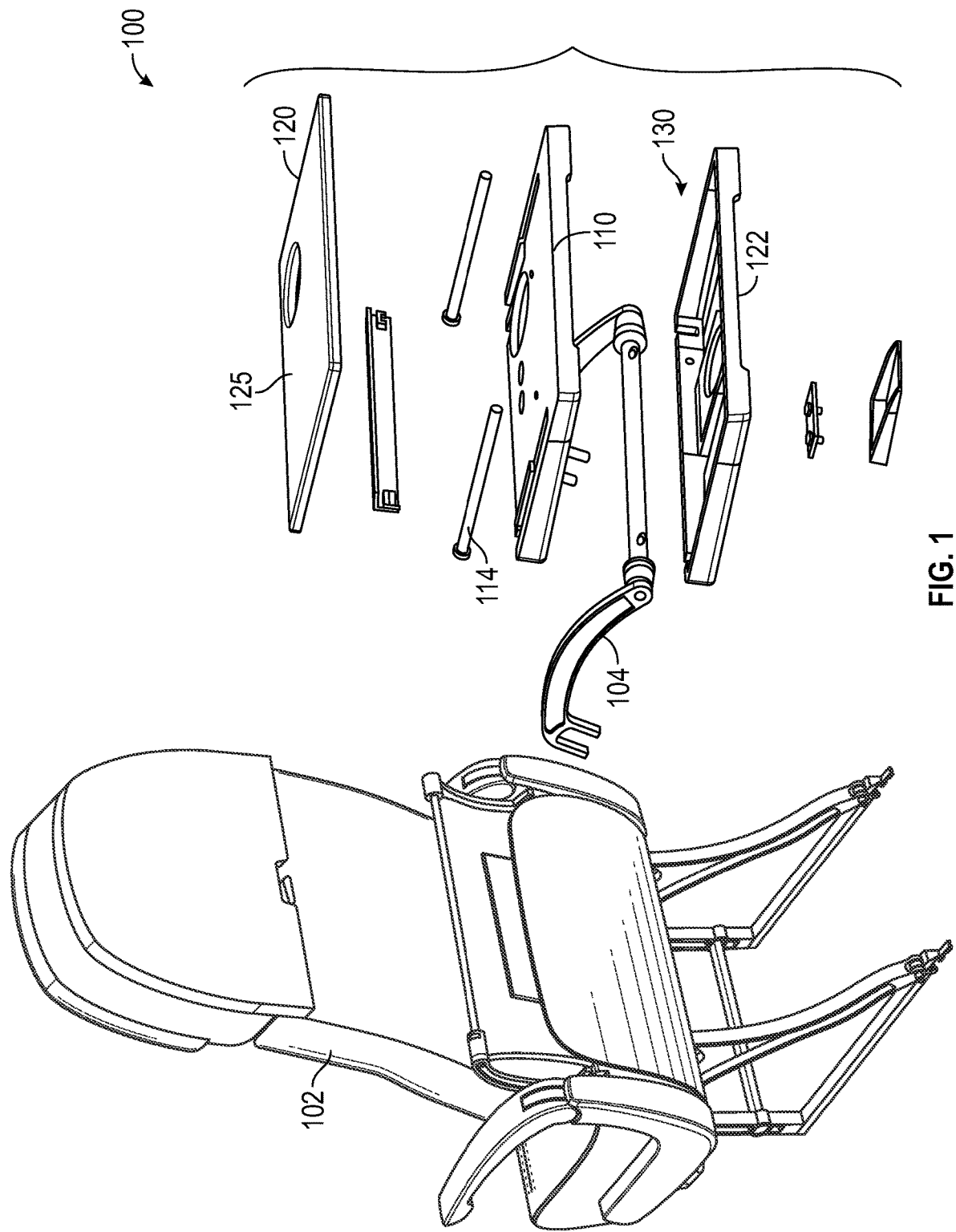
FIG. 1 is an exploded view of a tray table assembly of a passenger seat, according to certain embodiments of the present invention.

FIG. 1 is an exploded view of a tray table assembly 100 of a passenger seat 102, according to certain embodiments of the present invention. In some embodiments, the passenger seat 102 may include the tray table assembly 100 having a shroud 106 and a core assembly 110 (e.g., as described below). The passenger seat 102 may optionally include a tray table arm 104 (e.g., which may include or otherwise function as a table support or other suitable component of the passenger seat 102). The tray table arm 104 may attach the tray table assembly 100 having the core assembly 110 to the passenger seat 102. The tray table assembly 100 having the core assembly 110 may be pivotably supported by the tray table arm 104. The tray table arm 104 may be configured to allow the tray table assembly 100 to be deployed while an entity (e.g., a passenger) is using the tray table assembly 100 or to be stowed while the entity is not using the tray table assembly 100. The passenger seat 102 may optionally include a sliding mechanism 114 that may connect the tray table assembly 100 having the core assembly 110 to the tray table arm 104. In some embodiments, the tray table assembly 100 may optionally include one or more slide housings 212a-b (see FIG. 2) within the shroud 106 and affixed to the core assembly 110 (e.g., via at least one of a top sheet 202 or a honeycomb core 206).

The tray table assembly 100 may include various components. In certain embodiments, the tray table assembly 100 may include the shroud 106 and the core assembly 110. Optionally, the tray table assembly 100 may include the sliding mechanism 114, although the sliding mechanism 114 may be omitted in other embodiments. The tray table assembly 100 may include any other suitable components or combination of components as desired. When included, the sliding mechanism 114 may be positioned, via a slide housing (e.g., the slide housing 212a-b as best illustrated with respect to FIG. 2 and discussed in detail below) on any suitable component of the tray table assembly 100. As non-limiting examples, the sliding mechanism 114 may be positioned on the shroud 106, the core assembly 110, and/or any other suitable component of the tray table assembly 100. When included, the sliding mechanism 114 may allow the tray table assembly 100 to be deployed in an adjustable location via sliding and/or linear movement with respect to the entity.

The shroud 106 may include one or more parts or components and may be positioned around the core assembly 110 and/or the shroud 106 defines a receiving area 130 configured to receive and house the core assembly 110. As a non-limiting example, the shroud 106 is illustrated in FIG. 1 as including a top component 120 and a bottom component 122. The top component 120 may be positioned on a top portion of the core assembly 110, and the bottom component 122 may be positioned on a bottom portion of the core assembly 110. In some embodiments, the shroud 106 may define a top surface 125 of the tray table assembly 100 and a bottom surface, which may be opposite the top surface 125, of the tray table assembly 100. When used by a passenger or other user, the top surface 125 may be a surface that the user engages (e.g., positions a personal device, food, beverages, etc.) when the tray table assembly 100 is in the deployed position as illustrated in FIG. 1, and the bottom surface may generally face in an aft direction and/or the user when the tray table assembly 100 is stowed. As illustrated in the non-limiting example of FIG. 1, the receiving area 130 may be defined by the top component 120 and the bottom component 122, and the core assembly 110 is positioned within the receiving area 130 such that the core assembly 110 is between the top component 120 and the bottom component 122.

Figure 2:
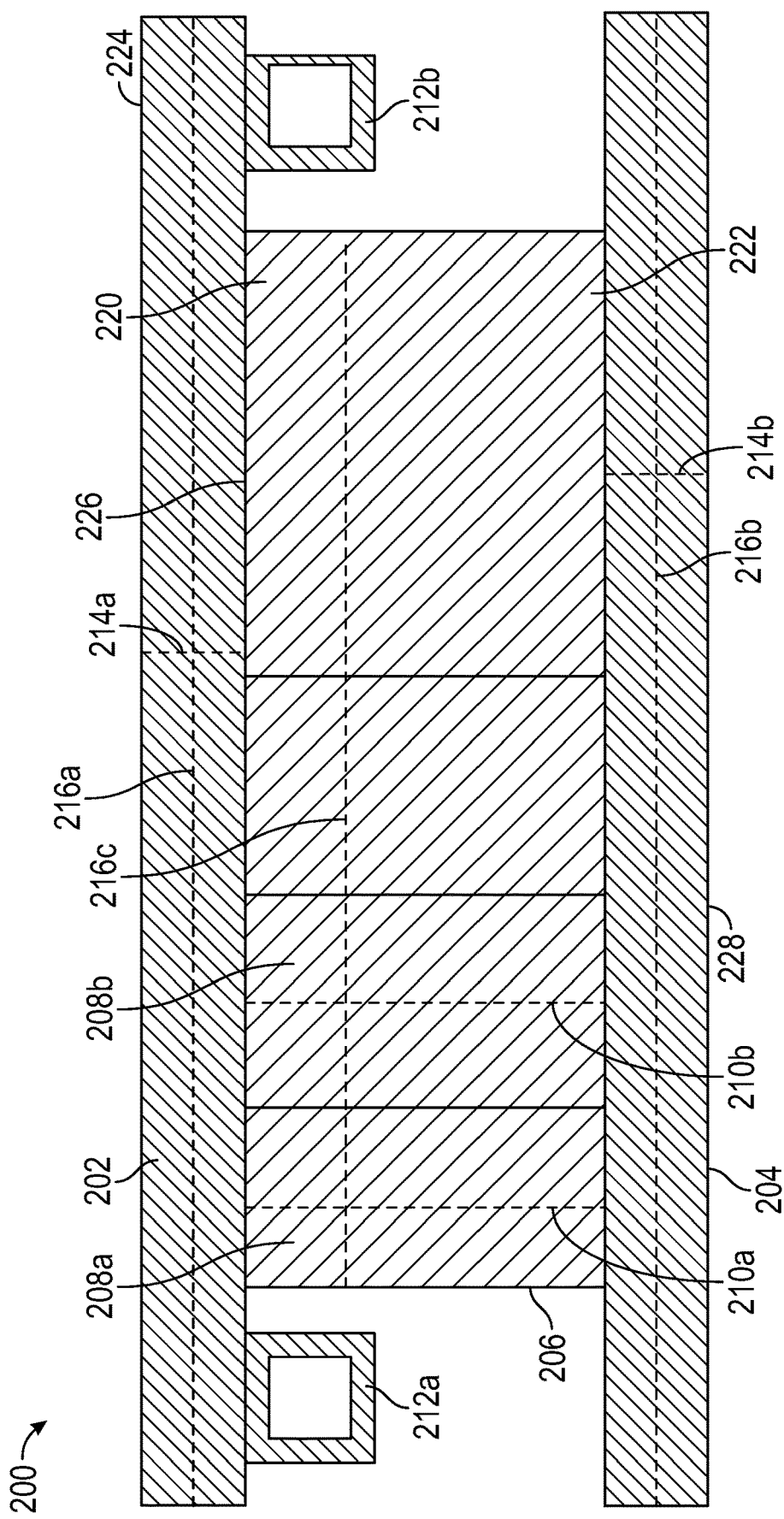
FIG. 2 is a sectional side-view of a core assembly of the tray table assembly of FIG. 1.

The core assembly 110 may be positioned within the shroud 106 and may provide strength, rigidity, stability, or other suitable performance indicators for the tray table assembly 100. As best illustrated in FIG. 2, the core assembly 110 includes a top sheet 202, a bottom sheet 204, and a honeycomb core 206. In certain embodiments, the tray table assembly 100 with the core assembly 110 described herein may reduce an amount of weight and/or resources associated with the tray table assembly 100 while retaining or improving the performance of the tray table assembly 100.

As mentioned, the core assembly 110 may include the top sheet 202, the bottom sheet 204, and the honeycomb core 206, and in other optional embodiments, may include other features or components as desired. As a non-limiting example, in the embodiment illustrated in FIG. 2, the core assembly 110 may optionally include a set of slide housings 212a-b that may receive or otherwise engage with the sliding mechanism 114. The slide housings 212a-b may be positioned on suitable components of the core assembly 110. In a non-limiting example, the slide housings 212a-b may be positioned on the top sheet 202, on the bottom sheet 204, on the honeycomb core 206, on any other suitable component of the core assembly 110, and/or on any suitable combination thereof. In the embodiment illustrated, the slide housings 212a-b are provided on the top sheet 202. In other optional embodiments, the slide housings 212a-b may be positioned within the shroud 106 or on an exterior surface of the shroud 106.

The top sheet 202, the bottom sheet 204, and the honeycomb core 206 may be constructed from or otherwise include any suitable materials or combination of materials as desired. As one non-limiting example, the top sheet 202, the bottom sheet 204, and/or the honeycomb core 206 may be made of or otherwise include a metal, including but not limited to aluminum or a suitable aluminum alloy. In some embodiments, the top sheet 202, the bottom sheet 204, and the honeycomb core 206 may be constructed from the same type of metal, although they need not in other examples.

Figure 3:
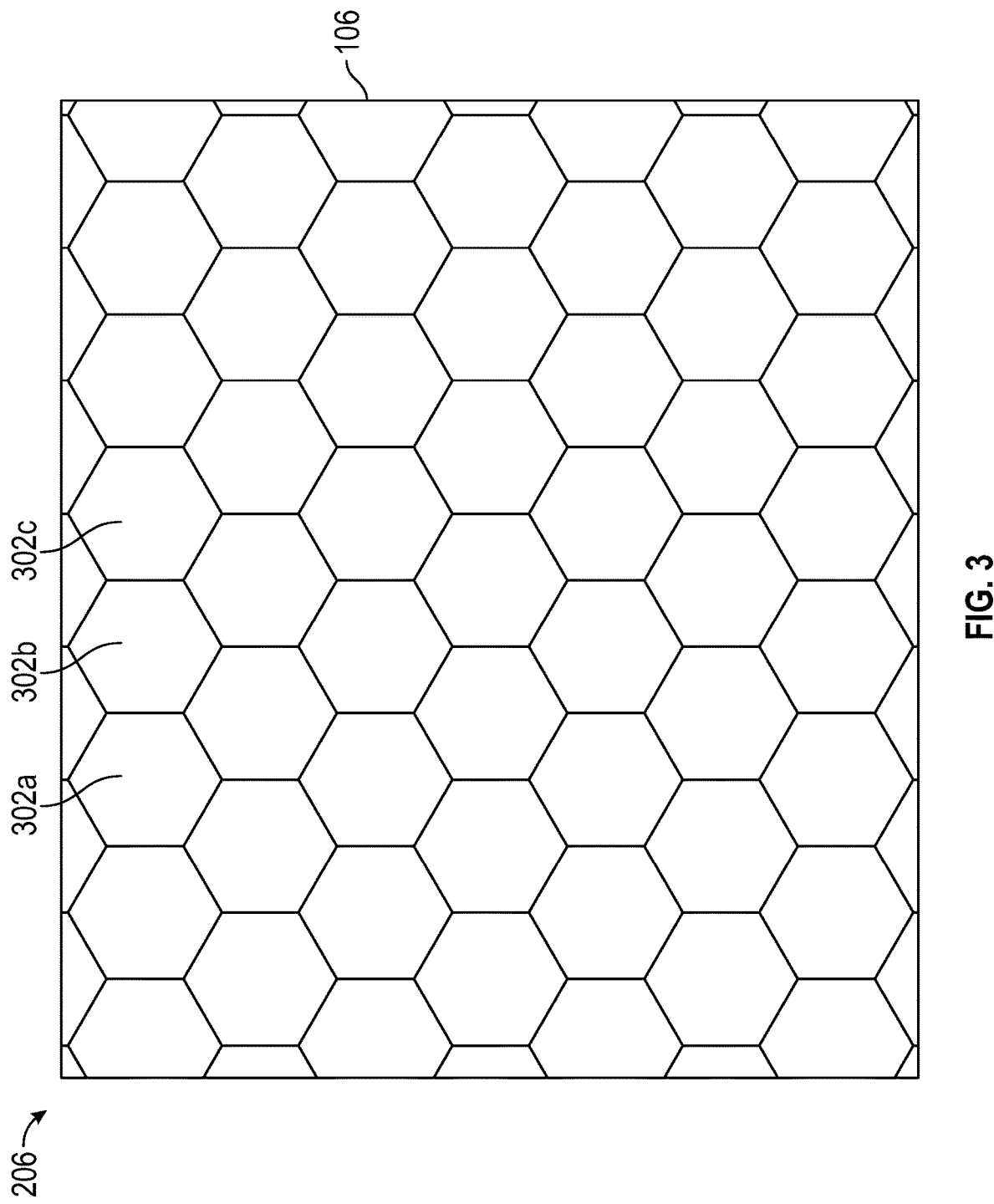
FIG. 3 is a sectional top-view of the core assembly of FIG. 2.

In certain embodiments, the top sheet 202 may be positioned on a top surface 220 of the honeycomb core 206, and the bottom sheet 204 may be positioned on a bottom surface 222 of the honeycomb core 206. As best illustrated in FIG. 3, and as discussed in detail below, the honeycomb core 206 may define a set of cells 302a-c and may be positioned between the top sheet 202 and the bottom sheet 204. As best illustrated in FIG. 2, the top sheet 202 may include a top surface 224 and a first bottom surface 226, and the bottom sheet 204 may include a second bottom surface 228. In this embodiment, the slide housings 212a-b are illustrated on the first bottom surface 226. In some embodiments, a first surface area defined by the top surface 224 may be different than (e.g., greater than) a second surface area defined by the second bottom surface 228. Alternatively, the first surface area and the second surface area may be similar or identical. In some embodiments, one or more of the components of the core assembly 110 may be integrally formed. As a non-limiting example, the honeycomb core 206 may be integrally formed with the bottom sheet 204, and the top sheet 202 may be affixed (e.g., mechanically, adhesively, etc.) to the top surface 220 of the honeycomb core 206 to form the core assembly 110.

In some embodiments, at least one characteristic of the top sheet 202 may be different from that of the bottom sheet 204 (and/or that that of the honeycomb core 206). The at least one characteristic may include, but is not limited to, a thickness, a width, a surface area, and/or any other suitable characteristic or combination of characteristics as desired. In a non-limiting example, a thickness 214a of the top sheet 202 may be different (e.g., greater than) than a thickness 214b of the bottom sheet 204. In other embodiments, the thicknesses 214a-b may be similar or identical. As another non-limiting example, a width 216a of the top sheet 202 may be different (e.g., greater than) a width 216b of the bottom sheet 204. The width 216a of the top sheet 202 may optionally be different (e.g., greater than) a width 216c of the honeycomb core 206. In other embodiments, any combination of two or more of the widths 216a-c may be similar or identical as desired.

As best illustrated in FIG. 3, the honeycomb core 206 may include a set of cells 302a-c, each of which may be hollow (e.g., empty or without material in a middle portion of the cell 302). As best illustrated with respect to FIG. 3, the set of cells 302 may span or otherwise be included in the core assembly 110 (e.g., and within the shroud 106). A cross-section of the set of cells may form a tessellation of similar shapes. In some embodiments, each cell 302 of the set of cells may be characterized by a similar shape. In a non-limiting example, the cells 302a-c illustrated in FIG. 3 are hexagonal, but the cells 302 of the honeycomb core 206 may be any other suitable shape such as rectangular, square, triangular, octagonal, etc. Moreover, in other embodiments, each cell 302 of the set of cells need not be the same shape, and the shape of one cell 302 may be different from the shape of another cell 302 as desired.

Cells (e.g., the adjacent cells 302a-b) of the honeycomb core 206 may each include a cross-section that may be a regular hexagon. In some embodiments, the cross-section of the cells 302a-b may be different shapes. As a non-limiting example, the cross-section of the cell 302a may be a regular hexagon, and the cross-section of the cell 302b may be rectangular. The cross-sections of the cells 302a-b may be any suitable shapes (e.g., regular or irregular) or combination of shapes.

Referring back to FIG. 2, each cell included in the honeycomb core 206 may include a central axis 210. In a non-limiting example, as illustrated in FIG. 2, cell 208a may include the central axis 210a and cell 208b may include the central axis 210b. The central axes 210a-b may be centralized within the cells 208a-b, respectively and may extend from the bottom sheet 204 to the top sheet 202 (or vice-versa). In some embodiments, the central axis 210a may be parallel to the central axis 210b. Accordingly, the central axes 210a-b of the cells 208a-b of the honeycomb core 206 may be parallel to each other. In some embodiments, the central axes 210a-b may be perpendicular to the top sheet 202, the bottom sheet 204, to the top surface 125 of the tray table assembly 100, or to any suitable combination thereof.

The elements or components of the tray table assembly 100, the passenger seat 102, or other suitable components may be constructed from various suitable materials as desired, including but not limited to, stainless steel, aramid fibers, polycarbonate, polypropylene, aluminum, aluminum alloys, magnesium, magnesium alloys, other metallic materials or non-metallic materials, composite materials, combinations thereof, or other suitable materials. In certain embodiments, at least one element or component of the tray table assembly 100 may optionally be constructed from a material that is different from the material used for another element or component of the tray table assembly 100. In a non-limiting example, the honeycomb core 206 may be constructed from a first material (e.g., aluminum or an aluminum alloy), and the shroud 106 may be constructed from a second material (e.g., a polymeric material or a plastic material) that may be different from the first material. In further embodiments, at least two of the elements or components of the tray table assembly 100 may be constructed from the same material.

Each of the components of the tray table assembly 100 (e.g., the shroud 106, the core assembly 110, etc.) may be formed via various manufacturing processes as desired. Suitable manufacturing processes include, but are not limited to, machining, forging, casting, printing, molding, combinations thereof, or other suitable processes as desired. In some embodiments, the manufacturing process used to form one component may be different from the manufacturing process used to form another component. In a non-limiting example, the shroud 106 may be formed via injection molding or other suitable processes, and the honeycomb core 206 may be integrally formed with one (or more) of the top sheet 202 and the bottom sheet 204 via machining.

In the following, further examples are described to facilitate the understanding of the invention:

Example 1: A tray table for a passenger seat, the tray table comprising: a shroud forming an outer surface of the tray table; and a core assembly within the shroud, the core assembly comprising: a top sheet; a bottom sheet; and a honeycomb core between the top sheet and the bottom sheet, wherein the honeycomb core defines a plurality of cells.

Example 2: The tray table of any of the preceding or subsequent examples, wherein the top sheet, the bottom sheet, and the honeycomb core each comprise aluminum.

Example 3: The tray table of any of the preceding or subsequent examples, wherein a thickness of the top sheet is different from a thickness of the bottom sheet.

Example 4: The tray table of any of the preceding or subsequent examples, wherein the thickness of the top sheet is greater than the thickness of the bottom sheet.

Example 5: The tray table of any of the preceding or subsequent examples, wherein the outer surface comprises a top surface of the tray table, and wherein each cell of the plurality of cells of the honeycomb core comprises a central axis extending perpendicular to a plane of the top surface of the tray table.

Example 6: The tray table of any of the preceding or subsequent examples, wherein a width of the top sheet is different from a width of the bottom sheet.

Example 7: The tray table of any of the preceding or subsequent examples, wherein the width of the top sheet is greater than the width of the bottom sheet.

Example 8: The tray table of any of the preceding or subsequent examples, wherein a width of the top sheet is different from a width of the honeycomb core.

Example 9: The tray table of any of the preceding or subsequent examples, wherein the width of the top sheet is greater than the width of the honeycomb core.

Example 10: The tray table of any of the preceding or subsequent examples, wherein the top sheet comprises a top surface and wherein the bottom sheet comprises a bottom surface, and wherein a surface area of the top surface is greater than a surface are of the bottom surface.

Example 11: The tray table of any of the preceding or subsequent examples, further comprising a slide housing within the shroud and attached to the core assembly, wherein the slide housing is configured to engage a sliding mechanism of the tray table, wherein the slide housing is attached to the top sheet, the honeycomb core, or the bottom sheet.

Example 12: The tray table of any of the preceding or subsequent examples, wherein the top sheet comprises a top surface and a bottom surface, and wherein the slide housing is attached to the bottom surface of the top sheet.

Example 13: The tray table of any of the preceding or subsequent examples, further comprising a slide housing attached to the shroud, wherein the slide housing is configured to engage a sliding mechanism of the tray table.

Example 14: A passenger seat assembly comprising: the tray table of any of the preceding or subsequent examples; and a table support attaching the tray table to the passenger seat, wherein the tray table is pivotably supported on the table support.

Example 15: The passenger seat of any of the preceding or subsequent examples, further comprising a sliding mechanism connecting the tray table with the table support, wherein the tray table further comprises a slide housing within the shroud and attached to at least one of the top sheet or the honeycomb core.

Example 16: A tray table for a passenger seat, the tray table comprising: a shroud forming a top surface and a bottom surface of the tray table; and a core assembly within the shroud, the core assembly comprising a honeycomb core defining a plurality of cells, wherein each cell of the plurality of cells comprises a central axis extending perpendicular to at least one of the top surface or the bottom surface of the tray table.

Example 17: The tray table of any of the preceding or subsequent examples, wherein the core assembly further comprises a top sheet and a bottom sheet within the shroud, and wherein the honeycomb core is between the top sheet and the bottom sheet.

Example 18: The tray table of any of the preceding or subsequent examples, wherein at least one characteristic of the top sheet is different from the bottom sheet, and wherein the at least one characteristic comprises a thickness, a width, or a surface area.

Example 19: A tray table for a passenger seat, the tray table comprising: a shroud assembly defining a top surface of the tray table, a bottom surface of the tray table, and a receiving area of the shroud assembly between the top surface and the bottom surface; and a core assembly within the receiving area of the shroud assembly, the core assembly comprising: a sheet; and a honeycomb core extending from the sheet and such that the sheet is between the honeycomb core and a portion of the shroud assembly, wherein the honeycomb core defines a plurality of cells.

Example 20: The tray table of any of the preceding or subsequent examples, wherein the sheet is a top sheet, wherein the core assembly further comprises a bottom sheet, wherein the honeycomb core is between the top sheet and the bottom sheet, and wherein the shroud assembly comprises a plastic material and the core assembly comprises a metal material.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A tray table for a passenger seat, the tray table comprising:
    a shroud comprising a top wall, a bottom wall, and a side wall extending between the top wall and the bottom wall, wherein the top wall, bottom wall, and side wall form an outer surface of the tray table, and wherein the top wall, bottom wall, side wall define a receiving area of the shroud; and
    a core assembly within the receiving area of the shroud and such that the core assembly is enclosed within the shroud, the core assembly comprising:
        a top sheet;
        a bottom sheet;
        a honeycomb core between the top sheet and the bottom sheet, wherein the honeycomb core defines a plurality of cells; and
        a slide housing positioned within the shroud and secured to the core assembly at the top sheet or the honeycomb core, wherein the slide housing is configured to engage a sliding mechanism of the tray table.

2. The tray table of claim 1, wherein the top sheet, the bottom sheet, and the honeycomb core each comprise aluminum.

3. The tray table of claim 1, wherein a thickness of the top sheet is different from a thickness of the bottom sheet.

4. The tray table of claim 3, wherein the thickness of the top sheet is greater than the thickness of the bottom sheet.

5. The tray table of claim 1, wherein the outer surface comprises a top surface of the tray table, and wherein each cell of the plurality of cells of the honeycomb core comprises a central axis extending perpendicular to a plane of the top surface of the tray table.

6. The tray table of claim 1, wherein a width of the top sheet is different from a width of the bottom sheet.

7. The tray table of claim 6, wherein the width of the top sheet is greater than the width of the bottom sheet.

8. The tray table of claim 1, wherein a width of the top sheet is different from a width of the honeycomb core.

9. The tray table of claim 8, wherein the width of the top sheet is greater than the width of the honeycomb core.

10. The tray table of claim 1, wherein the top sheet comprises a top surface and wherein the bottom sheet comprises a bottom surface, and wherein a surface area of the top surface is greater than a surface are of the bottom surface.

11. The tray table of claim 1, further comprising a slide housing within the shroud and attached to the core assembly, wherein the slide housing is configured to engage a sliding mechanism of the tray table, wherein the slide housing is attached to the top sheet, the honeycomb core, or the bottom sheet.

12. The tray table of claim 11, wherein the top sheet comprises a top surface and a bottom surface, and wherein the slide housing is attached to the bottom surface of the top sheet.

13. The tray table of claim 1, further comprising a slide housing attached to the shroud, wherein the slide housing is configured to engage a sliding mechanism of the tray table.

14. A passenger seat assembly comprising:
the tray table of claim 1; and
a table support attaching the tray table to the passenger seat, wherein the tray table is pivotably supported on the table support.

15. The passenger seat of claim 14, further comprising a sliding mechanism connecting the tray table with the table support, wherein the tray table further comprises a slide housing within the shroud and attached to at least one of the top sheet or the honeycomb core.

16. A tray table for a passenger seat, the tray table comprising:
a shroud forming a top surface and a bottom surface of the tray table; and
a core assembly enclosed within the shroud, the core assembly comprising:
a honeycomb core defining a plurality of cells, wherein each cell of the plurality of cells comprises a central axis extending perpendicular to at least one of the top surface or the bottom surface of the tray table;
a top sheet;
a bottom sheet, wherein the honeycomb core is between the top sheet and the bottom sheet; and
a slide housing positioned within the shroud and secured to the core assembly at the top sheet or the honeycomb core, wherein the slide housing is configured to engage a sliding mechanism of the tray table.

17. The tray table of claim 16, wherein at least one characteristic of the top sheet is different from the bottom sheet, and wherein the at least one characteristic comprises a thickness, a width, or a surface area.

18. A tray table for a passenger seat, the tray table comprising:
a shroud assembly defining a top surface of the tray table, a bottom surface of the tray table, and a receiving area of the shroud assembly between the top surface and the bottom surface; and
a core assembly enclosed within the receiving area of the shroud assembly, the core assembly comprising:
a top sheet;
a bottom sheet; and
an honeycomb core extending from the sheet and such that the sheet is between the honeycomb core and a portion of the shroud assembly, wherein the honeycomb core defines a plurality of cells, wherein the honeycomb core is positioned between the top sheet and the bottom sheet; and
a slide housing positioned within the shroud and secured to the core assembly at the top sheet or the honeycomb core, wherein the slide housing is configured to engage a sliding mechanism of the tray table.

19. The tray table of claim 18, wherein the honeycomb core comprises aluminum, and wherein the shroud assembly comprises a plastic material.

* * * * *